United States Patent Office 2,939,326
Patented June 7, 1960

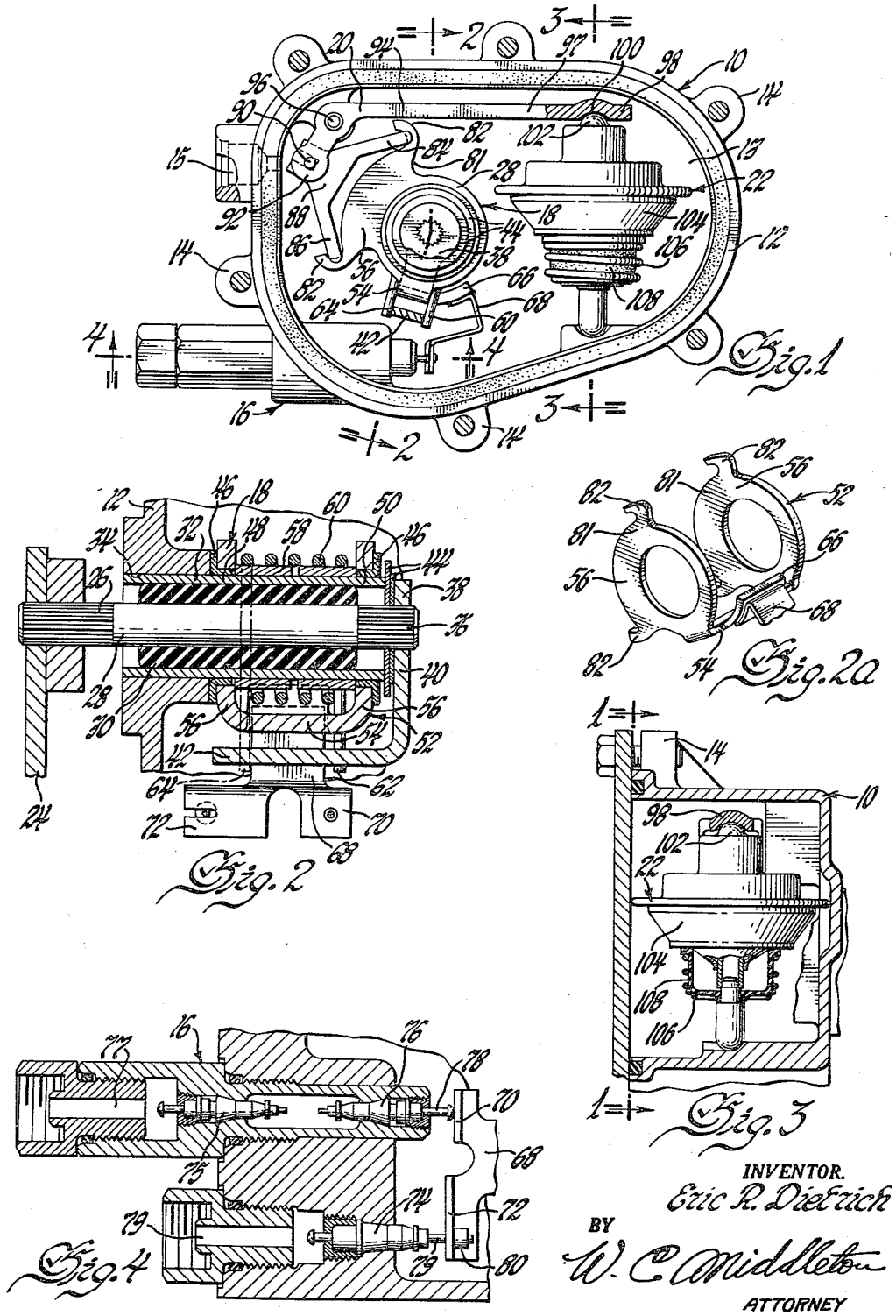

2,939,326

LEVELING VALVE CONTROL MECHANISM

Eric R. Dietrich, Lapeer, Mich., assignor to General Motors Corporation, Detroit, Mich., a corporation of Delaware Filed May 27, 1957, Ser. No. 661,705

8 Claims. (Cl. 74—96)

This invention relates to a valve controlling mechanism.

With the use in present day motor vehicles of air spring suspension systems instead of the conventional leaf springs and/or airplane type piston shock absorbers, the control of the supply and exhaust of air to these springs becomes important in order to maintain the sprung mass of the vehicle level and at the proper attitude at all times regardless of bumps or depressions in the road and passenger loads, etc. Due to the fact that it takes a predetermined time interval for the air to be supplied to or exhausted from the springs as needed to level the vehicle, occasions might arise when the sprung mass would be at the wrong attitude at the wrong time, i.e., with one side of the car in a depression, the air springs on that side would call for air to be supplied thereto to level the car; however, if it is but a momentary depression, by the time the air was supplied, the car would already be out of the depression, resulting in the car being higher on the one side than the other. The time necessary to correct this, to exhaust the air, would be of a duration to maintain the car in a tilted unpleasant attitude.

Therefore, it is a purpose of this invention to correct this situation by providing an air valve controlling mechanism that permits momentary fluctuations of the sprung mass with respect to the unsprung mass without supplying or exhausting air to the springs, but is activated to level the car by supplying or exhausting air to the springs upon a continued movement of the sprung mass in one direction with respect to the unsprung mass, i.e., as in the case of rounding a curve for any appreciable time where, due to centrifugal force acting on the car, the sprung mass will be displaced with respect to the unsprung mass.

Therefore, it is an object of this invention to provide an air valve control mechanism having retarding means to prevent actuation of the valves upon momentary changes in the position of the sprung mass with respect to the unsprung mass, but permitting actuation upon a continued change in one direction in the relative positions of the two masses.

It is a further object to provide an air valve control mechanism having a retarding means adapted to be activated by a single lever upon a change in the relative positions of said masses away from their normal positions.

It is still a further object of this invention to provide an air valve control mechanism wherein the valve actuation retarding means consists of a single dash-pot actuated by a single lever having an operating stroke and a return stroke whereby the lever operates the dash-pot regardless of the direction of displacement of the sprung and unsprung masses away from their normal positions.

Other features, advantages and objects will become apparent by reference to the detailed description of the invention and to the drawings wherein;

Figure 1 is a side elevational view on a reduced scale of the valve controlling mechanism embodying this invention as seen in the direction of arrows 1—1 of Figure 3, Figure 2 is an enlarged cross-sectional view of the lever system controlling the actuation of the valves as seen in the direction of arrows 2—2 of Figure 1, Figure 2A is a perspective view of the valve actuating lever, Figure 3 is a partial sectional end elevational view of the dash-pot means as seen in the direction of arrows 3—3 of Figure 1, and Figure 4 is an enlarged cross-sectional view of the air valves as seen in the direction of arrows 4—4 of Figure 1.

Referring now to the drawings and more particularly to Figure 1, wherein there is shown an air valve controlling mechanism 10 having a housing 12 adapted to be connected by means of ears 14 to a suitable point on the sprung mass (not shown) of the vehicle system adjacent the air chamber (not shown) communicating with the air springs (not shown). The confines of housing 12 define an air chamber 13 connected to the air in the air springs by means of a conduit or pipe 15. Also positioned in housing 12 are the intake and exhaust valves in housing 16 positioned one behind the other, as seen in Figure 4, and adapted to be actuated by a lever mechanism 18 having a connection by means of a reciprocating lever 20 to a dash-pot retarding means 22.

Referring to Figure 2, a control arm 24, adapted to be pivotally connected to some portion of the unsprung mass of the vehicle for reflecting relative movement between the sprung and unsprung masses, has a splined connection 26 with what will be called a drive shaft 28. Shaft 28 is suitably supported in a rubber-like sleeve 30 that is press fitted into place between a sleeve 32 and shaft 28, sleeve 32 being mounted in a bore 34 of the housing 12. Shaft 28 is thus suitably supported for relative rotation with respect to the sleeve 32 with the rubber-like sleeve 30 acting as a seal to prevent escape of air from chamber 13.

Suitably splined to the other end 36 of the shaft 28 for rotation therewith is a first or primary lever 38 having a lateral portion 40 and a portion 42 extending parallel with respect to drive shaft 28. Positioned between the sleeve 32 and lever 38 are a plurality of washer-like bearing members 44 permitting relative rotation between the two. Suitably journaled on bearing members 46 mounted on the sleeve 32 at 48 and 50 is a second lever 52 of generally U-shape design having a portion 54 parallel to portion 42, and a plurality of lateral portions 56. Spirally surrounding a sleeve 58 mounted on sleeve 32 is a torsion spring 60 having one end 62 abutting the side of portion 54 of lever 52 and encompassing the parallel portion 42 of lever 38. The other end 64 of the spring abuts the opposite side of portion 54 of lever 52 and encompasses the portion 42 of lever 38 on its opposite side. Thus, it will be seen that the torsion spring 60 connects the two levers to move the second lever 52 upon rotation of lever 38, or if lever 52 is prevented or retarded from rotating, permits movement of lever 38 without movement of lever 52 by stressing spring 60. Attached to an extended portion 66 of lever 52 is a thin metal valve actuating portion 68 of irregular configuration having, as seen in Figure 4, valve actuating flanges 70 and 72.

The valves to be actuated for supplying air to or exhausting air from the air springs through the pipe 15 consist of a plurality of conventional spring closed tire valves 74, 75 and 76, valves 75 and 76 being located in the intake line 77 leading from the high pressure air source, with exhaust valve 74 leading to the atmosphere through a line 79.

The intake valve 76 has a stem 78 extending into abutting relationship with the valve flange 70 to be operated thereby to open the valve by movement of the flange in one direction and to close the valve by movement of the flange 70 in the opposite direction.

The exhaust valve 74 is reversed from the position of valve 76 with a stem 79 extending slidably through the valve flange 72 and being fitted with a lug 80 so as to permit relative movement of the valve 74 and plate 72 in one direction, with the operation of the valve 74 in the other direction by the pulling of stem 79 by plate 72 acting against lug 80.

Valve 75 is a one-way check valve normally opened by the pressure of air in line 77 but capable of being closed in the event of the existence of a high enough pressure in chamber 13 to force valve 76 open against the action of its spring at a time when such an opening is not called for by movement of flange 70.

Also formed integrally with the secondary lever 52 is a bell-shaped flange member 81 having curved end portions 82 adapted to act as force points and shaped to form pockets or recesses to receive the end or legs 84 and 86 of a triangularly-shaped hollowed-out strut member 88 pivotally connected at 90 to one end 92 of a bell crank lever or member 94. Bell crank member 94 is pivotally mounted at 96 to a stationary portion of the housing 12 and is provided with one arm 97 having an end portion 98 formed with an indentation 100 to engage the plunger portion 102 of a conventional dash-pot 104.

The assembly of flange 81 together with link 88 pivoted at 90 is such that rotation of the secondary lever away from its normal position in either direction about the drive shaft exerts a force through legs 84 or 86 to always move the pivot point 90 in a direction toward the housing and away from the drive shaft.

Thus, bell crank lever 94 has a uni-directional operating stroke whereby it bears against the plunger 102 of the dash-pot to activate the same and has a return stroke returning the lever to its original position by means of a spring 106. Dash-pot 104 is a conventional diaphragm dash-pot of the type shown in U.S. Patent No. 2,657,038, Emerson, wherein movement of the plunger 102 in one direction is resisted or retarded by a pneumatic orifice while return movement under the influence of spring 106 surrounding a rubber boot 108 is unresisted and therefore occurs at an unretarded rate of movement.

*Operation*

Upon movement of the sprung mass of the vehicle towards or away from the unsprung mass as would occur when the vehicle is traveling over a bump or depression in the road or when rounding a curve, the lever 24 will be moved to rotate shaft 28 in one or the other directions thereby rotating the first or primary lever 38. Due to the levers 38 and 52 being connected by means of the torsion spring 60, rotation of lever 38 will imply a force to attempt to rotate the secondary lever 52. This force will be transmitted through flange 81 to act on one or the other of fingers 84 or 86, depending upon the direction of rotation of shaft 28, to attempt to move the end 92 of lever 94 in a clockwise direction. Lever 94 will attempt to move through its operating stroke bearing against the plunger 102 whereby the dash-pot is rendered effective to retard or resist movement of the lever in this direction. Due to the nature of the dash-pot 104, the return or escape of air through the diaphragm orifice is such that the plunger is retarded in its movement until a predetermined time has elapsed after the initial actuation. Therefore, because of the linkage connection with the dash-pot, secondary lever 52 will be delayed or retarded from rotating until a sufficient time has elapsed to bleed all of the air in the dash-pot through the orifice. Thus, the secondary lever will remain approximately stationary without actuating the air valves until a sufficient time has elapsed when the torsion spring 60 can overcome the action of the dash-pot to rotate the secondary lever to a position corresponding to the position of the primary lever.

If the drive shaft 28 is rotated in one direction for a brief interval with an insufficient lapse of time to permit the torsion spring to overcome the action of the dash-pot, and then is rotated in a reverse direction, bell crank lever 94 will be actuated through its return stroke by torsion spring 60 and dash-pot spring 108 to place both the primary and secondary lever in their initial positions. Therefore, it is seen that momentary rotation of the drive shaft 28 in either direction for a brief interval of time with a sudden return to its initial or neutral position will not permit movement of the secondary lever with the primary lever by the spring 60. The bell crank lever 94 will be retarded in its movement by the initial action of the dash-pot, and a sudden return of the drive shaft to its original position will permit the free movement of the lever 94 through its return stroke. If the drive shaft 28 continues to be rotated in one direction for an appreciable length of time sufficient to overcome the action of the dash-pot 104, the bell crank lever 94 will be permitted to move through its operating stroke to permit operation of the particular valve 72 or 74 to supply air to or exhaust air from the air springs through conduit 15 depending upon the direction of rotation of the secondary lever.

From the foregoing it will be seen that applicant has provided an air suspension valve controlling mechanism that is efficient in operation and prevents the actuation of the valves upon momentary fluctuations in the height of the sprung mass relative to the unsprung mass, while permitting the supply or exhaust of air to and from the air springs to level the sprung mass upon a continued differential in height between said masses. It will also be seen that the control system affords a quick centering device to permit the valves to return to their closed positions quickly in order to be ready to be actuated by movement of the lever system in the opposite direction, as would be the case when the vehicle is negotiating an S-shaped turn, i.e., the system provides an instant response to the return of the masses to their original normal positions, but a delayed response to any change in displacement between the two. It will further be seen that applicant has provided a valve control system wherein a single dash-pot with a single uni-directional operating lever is provided for all rotations of the secondary lever means away from its neutral position. It will be understood that the invention can be modified beyond the illustrated embodiments, and therefore, any limitations to be imposed are those set forth in the following claims.

I claim:

1. A valve actuating mechanism comprising a plurality of valves operable in opposite directions, a drive shaft rotatable in either direction, first lever means fixed on said drive shaft, second lever means rotatably mounted on said shaft and attached to said valves, yielding means connecting said levers for rotating said second lever upon rotation of said first or permitting relative rotation therebetween, and means for delaying the rotation of said second lever upon rotation of said shaft, said delaying means comprising a dash-pot and actuator means for said dash-pot, said dash-pot having an operative and an inoperative direction of movement, said operative movement retarding movement of said actuator means, said actuator means comprising a bell crank mounted adjacent said second lever, said second lever being rotatable in opposite directions from a neutral position for actuating said valves, and driving linkage interconnecting said second lever and bell crank operative responsive to rotation of said second lever in either direction from its neutral position to move said bell crank in the direction of operative movement of said dash-pot, said yieldable means operating to rotate said second lever means to operate said valves upon a sustained rotational displacement of said first lever means in one direction.

2. In combination, a rotary member having a predetermined neutral angular position, a linearly movable uni-directional damping device, and motion translating means interposed between said rotary member and said device effective to impart uni-directional linear movement to said device responsive to movement of said member in either direction from said predetermined neutral position.

3. In combination, a rotary member having a predetermined neutral angular position, a linearly movable uni-directional damping device, and motion translating means interposed between said rotary member and said device effective to impart uni-directional linear movement to said device in the direction which the latter exerts damping action responsive to movement of said member in either direction from said predetermined neutral position.

4. A motion controlling mechanism comprising a lever rotatable in either of two directions from a neutral position, means for rotating said lever, a uni-directionally active motion retarding device, operating mechanism disposed between said lever and said device, said mechanism comprising a bell crank having one end in engagement with said device, and means interposed between the other end of said bell crank and said lever adapted to impart uni-directional movement to said device in its active direction responsive to rotation of said lever in either direction from said neutral position.

5. A motion controlling mechanism comprising a lever rotatable in either of two directions from a neutral position, impositive driving means for rotating said lever, a uni-directionally active motion retarding device, operating mechanism disposed between said lever and said device, said mechanism comprising a bell crank having one end in engagement with said device, and means interposed between the other end of said bell crank and said lever adapted to impart uni-directional movement to said device in its active direction responsive to rotation of said lever in either direction from said neutral position.

6. A motion controlling mechanism comprising, means to be actuated, a lever rotatable in either of two directions, means for impositively rotating said lever, and connecting means between said lever and said means to be actuated, said connecting means including a pivotally mounted bell crank having a uni-directional operating stroke and a return stroke, one end of said member being positioned adjacent said means to be actuated for actuation thereof, said lever means having a flanged portion provided with circumferentially spaced lugs, and means engaging said lugs comprising a generally V-shaped element having a pivotal connection with the other end of said bell crank whereby rotation of said lever in either direction causes said bell crank to actuate said member.

7. The structure set forth in claim 6 wherein said V-shaped element is symmetrical and said lugs are normally disposed at equal opposite angles from the pivotal connection of the V-shaped element and the other end of said bell crank thereby providing uniform magnitude of operating stroke of said bell crank responsive to equal angular movement of said lever in either direction.

8. A leveling valve assembly comprising a housing, a pair of valves in said housing arranged for actuation in opposite directions, delayed action valve operating mechanism including an impositively driven rotary member mounted in said housing, said member having circumferentially spaced driving lugs formed thereon, a bell crank pivoted on a fixed axis in said housing spaced from the axis of said rotary member, a uni-directionally active dashpot abuttingly engaging one end of said bell crank, an oscillating element pivoted on the other end of said bell crank, said oscillating element having symmetrical diverging legs extending between and abuttingly engaging said driving lugs whereby said dashpot is actuated in its active direction responsive to angular movement of said rotary member in either direction from a predetermined neutral position, and means on said rotary member adapted to actuate one of said pair of valves upon predetermined angular movement in one direction from neutral and to actuate the other of said pair of valves upon predetermined movement in the other direction from neutral.

References Cited in the file of this patent

UNITED STATES PATENTS

| | | |
|---|---|---|
| 649,188 | Westinghouse et al. | May 8, 1900 |
| 792,038 | Hocke et al. | June 13, 1905 |
| 1,066,313 | Parrott | July 1, 1913 |
| 1,398,929 | Becker | Nov. 29, 1921 |
| 2,607,611 | Allison | Aug. 19, 1952 |
| 2,670,201 | Rossman | Feb. 23, 1954 |